March 3, 1964 R. P. SPINOZA 3,123,246
CONTAINER AND LID ARRANGEMENT
Filed April 27, 1962
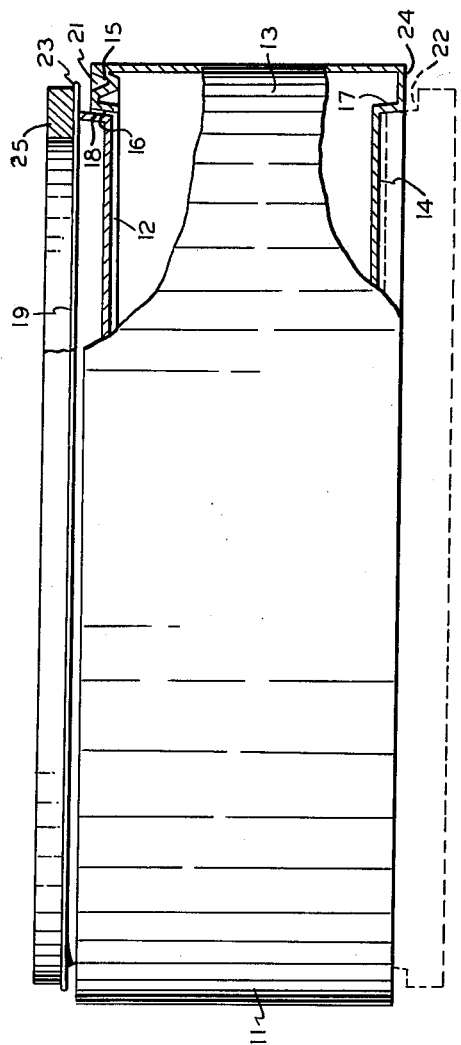
INVENTOR
RUDOPH P. SPINOZA
BY *Dodge and Sons*
ATTORNEYS

United States Patent Office 3,123,246
Patented Mar. 3, 1964

3,123,246
CONTAINER AND LID ARRANGEMENT
Rudolph P. Spinoza, 2121 Shore Parkway,
Brooklyn, N.Y.
Filed Apr. 27, 1962, Ser. No. 190,591
2 Claims. (Cl. 220—42)

This invention relates to an improved container and lid arrangement. Specifically, it relates to a lid which is adapted to be attached to either the top or the bottom of a container and which has a means secured thereto whereby, when the lid is attached to the bottom of the container, this means will prevent the container from scratching or slipping off a supporting surface.

Heretofore, when a person placed a metallic, auto polish can on a surface of an automobile while he was polishing some adjacent part, there was a tendency for the can to scratch or slip off the surface due to the metal-to-metal contact. This invention prevents such scratching and slipping while still permitting the person polishing an automobile to place the polish can nearby on an adjacent part.

The preferred embodiment of the invention will now be described with reference to the accompanying drawing.

In this drawing, parts of the container and lid are broken away so that the details of the lid-securing means will be apparent. The lid is also shown attached to the bottom of the container in phantom.

The cylindrical container 11 has an open top 12, a side wall 13 and a closed bottom 14. Encircling the open top 12 is bent flange 15 which has a substantially vertical surface 16 at its radially inner edge. The closed bottom 14 is planar except for the inward directed, substantially vertical surface 17. The circular surface 16 and 17 have the same diameter and each is adapted to engage and retain by friction the surface 18 of the lid 19. Between the outer periphery of the lid and the inner periphery of the side wall 13 is an annular gap 21 which permits the insertion of a tool (not shown) for removal of the lid from the top of the container. Moreover, the depth of the surface 17 is such that when the lid 19 is retained on the bottom of the container, there is a gap 22 between the inner face of the outer annular rim 23 of the lid and the portion 24 of the container which permits the insertion of a tool (not shown) for removal of the lid from the bottom of the container.

A ring 25 of soft rubber-like material is firmly secured, as by bonding with an adhesive, to the outer face of the rim 23. This ring may consist of any soft rubber, plastic or synthetic material which will not scratch or mar a finished metallic surface and which has a tendency not to slide on the finished surface. The ring 25 projects well above the side wall 13 so that when the end of the container to which the lid is attached, is adjacent to a supporting surface, the ring 25 is the only portion of the container and lid arrangement which is actually in contact with the supporting surface.

Of course, it is within the scope of this invention to have a lid attaching means different from that shown and to design such attaching means so that when the lid is attached to the top end of the container, the soft rubber-like material is disposed protectively within the closed container.

What is claimed is:
1. An improved container and lid arrangement comprising a container having an open top and a closed bottom; a lid adapted to be selectively attached to the top and to the bottom of the container and a soft rubber-like member secured to the lid so that when the lid is attached the member is exposed and provides a supporting base for the container.

2. An improved container and lid arrangement comprising a container having an open top and a closed bottom, and a lid having a single, attaching surface adapted to be selectively attached to either the top or the bottom of the container and having a soft rubber-like means secured thereto so that when the lid is attached, the means is exposed and serves as a supporting base for the container.

References Cited in the file of this patent

FOREIGN PATENTS

| | | |
|---|---|---|
| 143,406 | Germany | May 15, 1935 |
| 793,395 | France | Nov. 16, 1935 |
| 1,203,117 | France | July 5, 1959 |